E. W. RYER.
STOVE OR FURNACE.
APPLICATION FILED MAR. 12, 1919.
1,345,887.
Patented July 6, 1920.
3 SHEETS—SHEET 1.
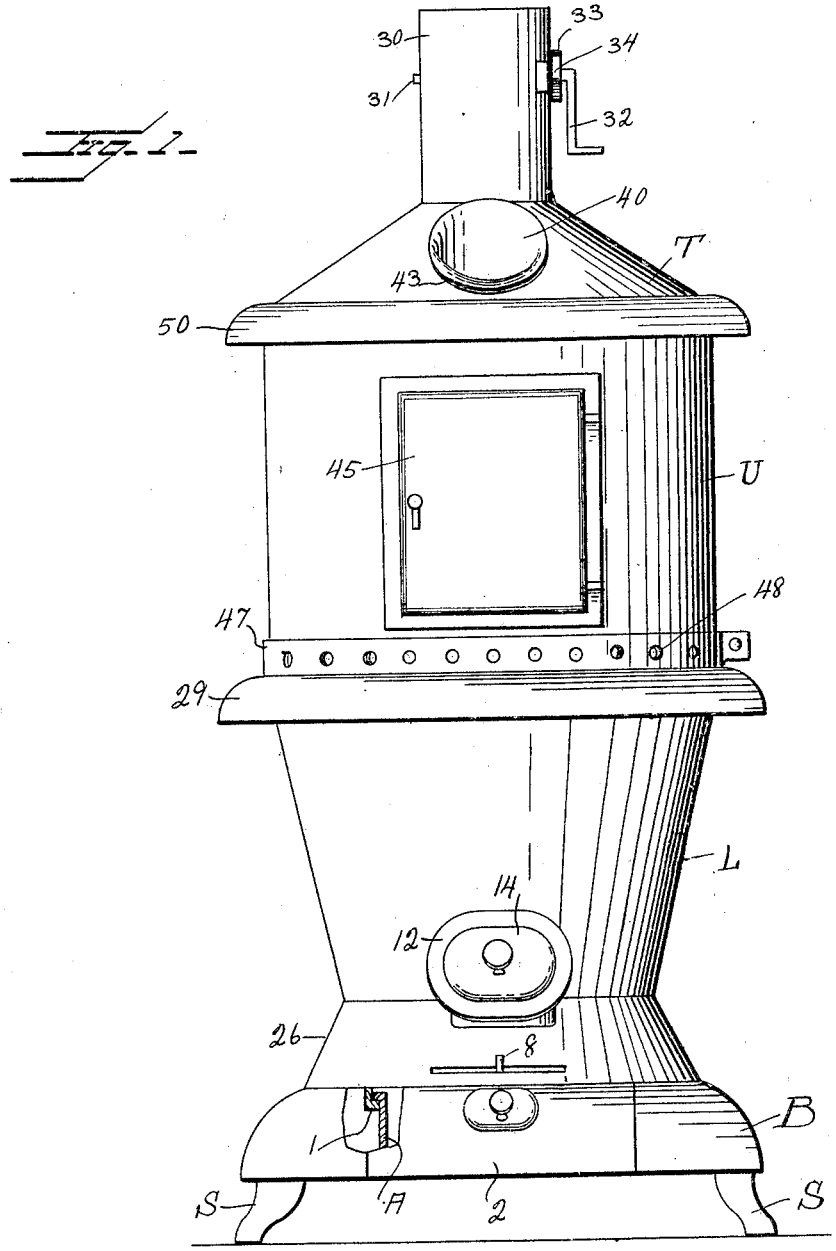
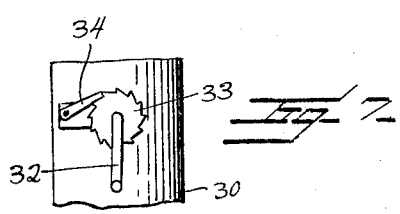
Inventor
E. W. Ryer
By Watson E. Coleman
Attorney

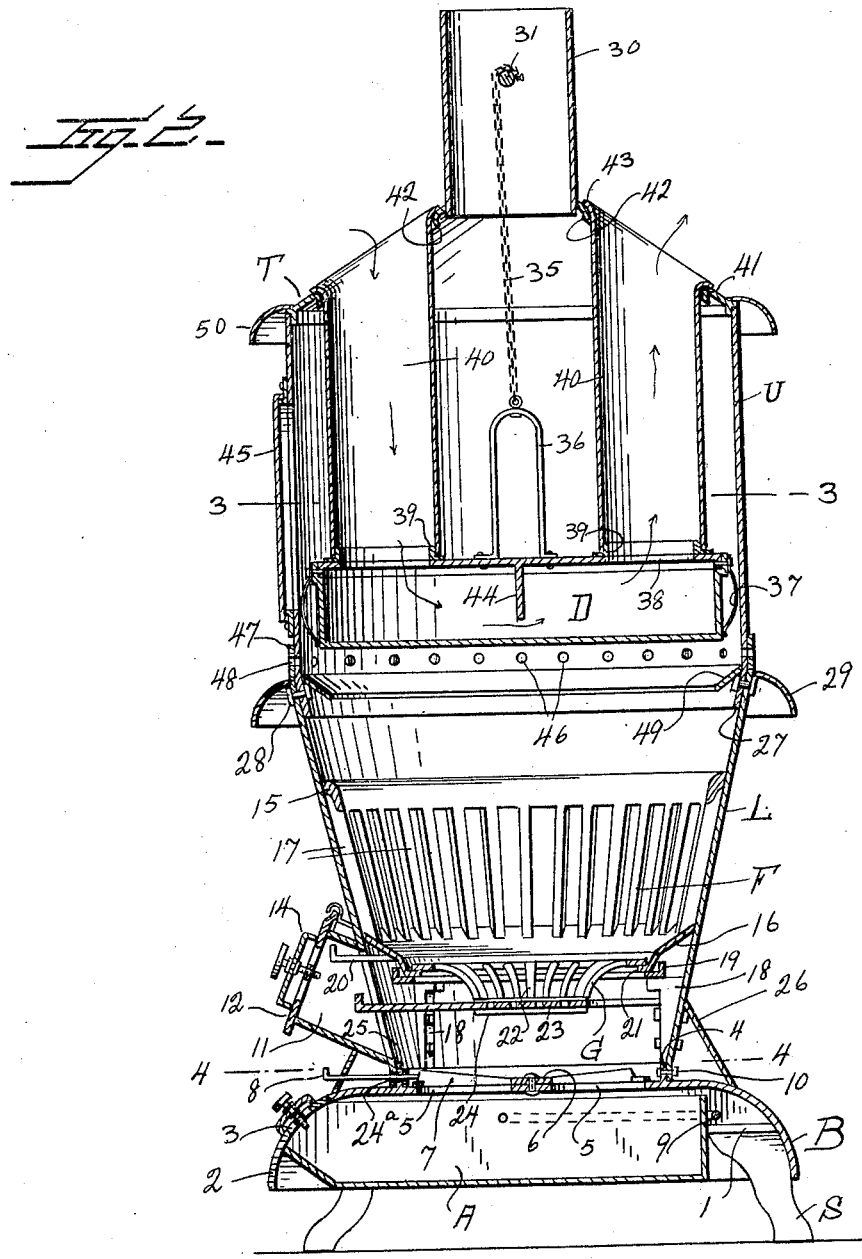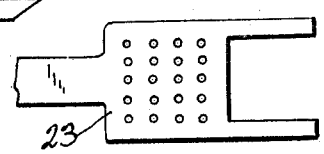

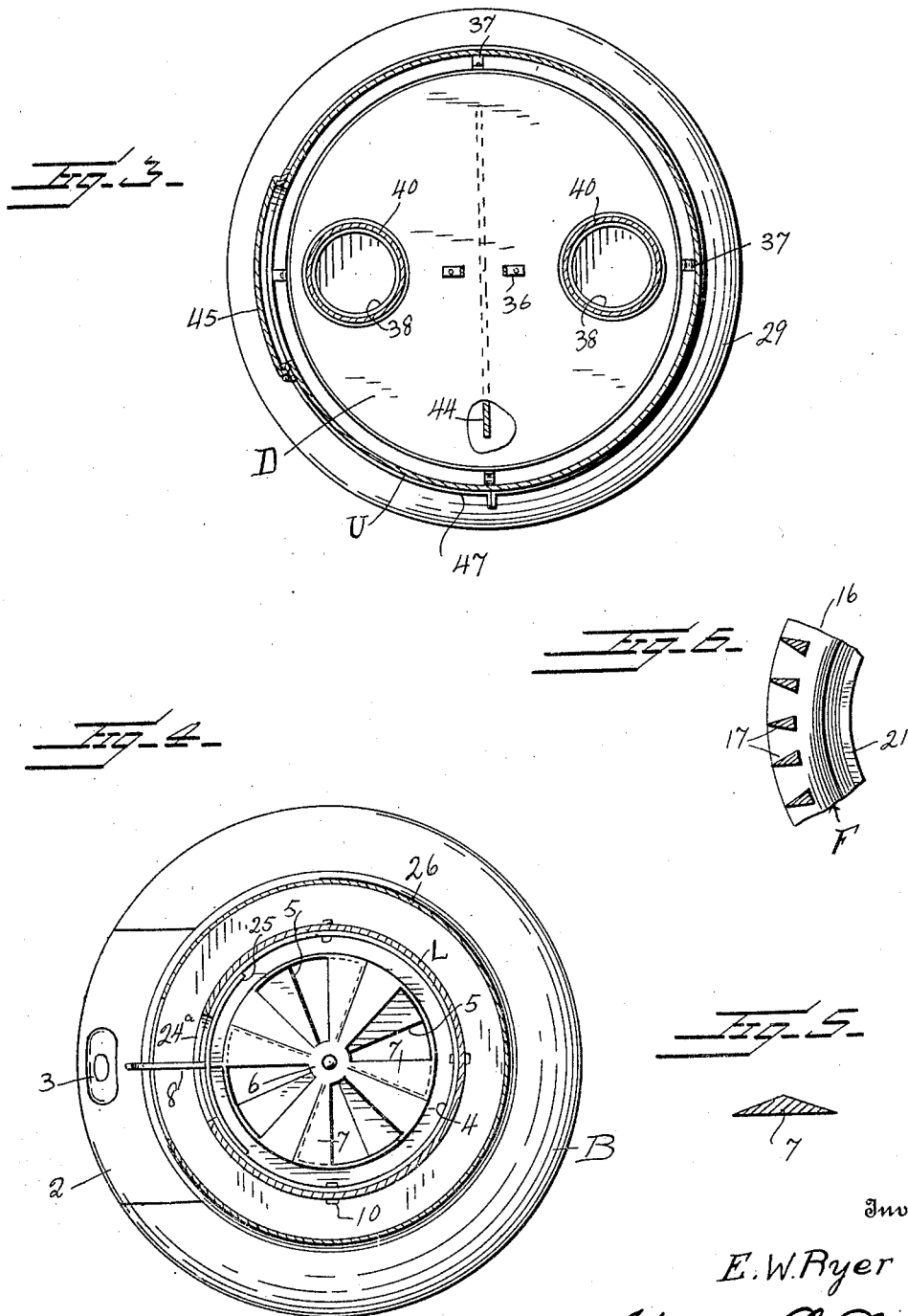

UNITED STATES PATENT OFFICE.

EVERETT W. RYER, OF COLORADO SPRINGS, COLORADO.

STOVE OR FURNACE.

1,345,887.  Specification of Letters Patent.  Patented July 6, 1920.

Application filed March 12, 1919. Serial No. 282,072.

*To all whom it may concern:*

Be it known that I, EVERETT W. RYER, a citizen of the United States, residing at Colorado Springs, in the county of El Paso and State of Colorado, have invented certain new and useful Improvements in Stoves or Furnaces, of which the following is a specification, reference being had to the accompanying drawings.

This invention relates to certain improvements in stoves or furnaces, and it is an object of the invention to provide a novel and improved heating unit of this general character which performs its heating function both by radiation and hot air.

It is also an object of the invention to provide a novel and improved device of this general character wherein a hollow drum is interiorly positioned and normally arranged in close proximity to the fire-pot and which is in communication with the atmosphere through the medium of up and down draft tubes, whereby air constantly circulates through the drum and thereby cools the bottom of the drum and discharges hot air for heating purposes.

A still further object of the invention is to provide a novel and improved device of this general character wherein an interiorly arranged hollow drum is normally positioned in close proximity to the fire-pot and which is in communication with the atmosphere and wherein said drum substantially and entirely intersects the interior of the device and wherein the drum has arranged therein a baffle to assure an equal distribution of air over the bottom of the drum.

Another object of the invention is to provide a novel and improved device of this general character including an interiorly arranged hollow drum in communication with the atmosphere and normally positioned in close proximity to the fire-box and wherein an annular member is interiorly supported below the drum to deflect the heat rising from the fire bed toward the central portion of the drum, together with valve controlled air openings arranged between said annular member and the normal position of the drum, whereby the gases included in the products of combustion will be caused to burn so that the heating efficiency of the unit is materially increased.

The invention consists in the details of construction and in the combination and arrangement of the several parts of my improved heating unit, whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in front elevation with a portion broken away of a stove or furnace constructed in accordance with an embodiment of my invention.

Fig. 2 is a vertical sectional view taken through the device as illustrated in Fig. 1.

Fig. 3 is a sectional view taken substantially on the line 3—3 of Fig. 2.

Fig. 4 is a sectional view taken substantially on the line 4—4 of Fig. 2.

Fig. 5 is a transverse sectional view taken through one of the blades or covers for controlling the delivery of ashes into the pan as herein employed.

Fig. 6 is a fragmentary horizontal sectional view taken through the fire-pot as herein embodied.

Fig. 7 is a fragmentary view in elevation illustrating the operating means for the winding shaft, and Fig. 8 is a fragmentary view in top plan of the slide coacting with the grate as herein embodied.

As disclosed in the accompanying drawings, B denotes the base of my improved heater which is preferably round and having its peripheral portion curved downwardly. Suitably engaged with the base B are the supporting legs S. The under side of the base B is provided with the parallel guideways 1 with which is slidably engaged an ash-pan A and the forward or outer end 2 of said pan A is substantially in continuity with the downwardly curved portion of the base B when the pan A is in applied position. The end 2 is provided with a draft opening 3 to allow air to be admitted to the ash-pan and upwardly through the heating unit in a manner which will hereinafter be described.

Extending upwardly from the base B is an upstanding annular flange 4 concentric to the axial center of the base B and said base B within the field defined by the flange 4 is provided with a series of equidistantly spaced openings 5 herein disclosed as four in number. The openings 5 are elongated and have their major axes substantially radiating from the axial center of the base B. Rotatably engaged with the axial center of the base B is a hub 6 from which radiate the blades or covers 7 substantially V-shaped in cross section and which when in one position close the openings 5. Suitably connected to one of the blades or covers 7 is an operating lever 8 extending exteriorly of the device and which affords means whereby the requisite oscillatory movement may be imparted to the blades or covers 7 to either close or open the openings 5.

When the openings 5 are open, the ashes drop from the fire bed and are received within the pan A and which pan underlies the openings 5. When the pan A has been filled substantially even with the openings 5, the blades or covers 7 are moved to close such openings and the ash-pan withdrawn and emptied. With this particular arrangement, the ash-pan will not overfill and the ashes will not fall upon the floor when the pan A is removed. The blades or covers 7 are made substantially V-shaped in cross section so that no ashes will remain thereon while being shaken down into the pan from the fire bed. When the blades or covers 7 are in their open position, they substantially bridge the space between the openings 5 and effectually serve as deflectors to effect the proper passage of the ashes through the openings 5 into the pan A. The pan A is provided with a suitable bail 9 whereby the same may be readily transported.

L denotes the lower section of the casing of the heating unit which is preferably made of sheet metal and of an inverted frusto-conical form. The lower or smaller end of the section L snugly surrounds the flange 4 and is secured thereto through the medium of the bolts 10 or the like, and the lower portion of said section L is provided with a draft opening or chute 11. Coacting with the outer end of the draft chute 11 is a door 12 provided with a damper 14.

Snugly fitting within the section L is a fire-pot F. The fire-pot F comprises an upper annular member 15 and a lower annular member 16, connected by the spaced slats 17. The lower annular member 16 slopes inwardly and downwardly so that any ashes or combustible matter resting thereon will gravitate down upon the grate G and thereby be prevented from collecting against the side wall of the section L to obstruct the free radiation of heat through said side wall.

Secured to the side wall of the lower section L and arranged therein are the brackets 18, preferably three in number, which support an angular ring or collar 19 and which ring or collar serves as a support for the fire-pot F but allowing oscillatory movement to be imparted to the fire-pot F when the occasions of practice may so require. The lower member 16 has extending outwardly therefrom an arm or projection 20 which extends within the opening or chute 11 and is adapted to have engaged therewith a poker or other implement to facilitate the oscillation of the fire-pot F.

The inner marginal portion of the lower annular member 16 is provided with an annular shoulder 21 upon which the marginal portion of the grate G rests and said grate is adapted to be oscillated independently of the fire-pot F for a well known purpose. The grate G includes the inwardly and downwardly curved bars 22 of a length to provide a central opening and which central opening is normally closed by the slide 23 supported by the lugs 24 depending from certain of the bars 22. The slide 23 extends within the opening or chute 11 and affords means whereby the grate G may be readily oscillated. In the event of the accumulation of clinkers, it is only necessary to pull the slide 23 outwardly a distance sufficient to unobstruct the central opening of the grate G and whereupon such clinkers will readily drop into the pan A in the same manner as hereinbefore explained relative to the ashes. In order to facilitate the passage of the draft upwardly through the fire bed, it is preferred that the portion of the slide 23 which underlies the central portion of the grate G be perforated.

Each of the slats 17 is substantially V-shaped in cross section with the apex outwardly directed and in contact with the inner wall of the section L so that when the fire-pot F is oscillated, the slats 17 will operate to remove from the inner wall of the section L any soot or other matter which may have clung thereto and thereby keeping said wall clean for the unhindered radiation of heat through such wall. It will also be understood by having the slats 17 of this cross sectional configuration, the heat produced in the fire-pot will radiate against nearly every portion of the wall of the section L.

The lower portion of the section L is provided with a horizontally disposed slot through which the lever 8 extends and secured to said lever is a slide 25 extending beyond opposite sides of the lever and which serves to maintain said slot or opening 24ᵃ closed irrespective of the position of the lever 8, so that the escape of ashes or the like through this opening or slot 24 is prevented.

26 is a collar surrounding the lower portion of the section L and resting upon the base B and against the lower portion of the section L. This collar gives a finished appearance to the device and also materially strengthens the connection between the section L and the base B.

U denotes the upper section of my improved device and is preferably cylindrical in form and also formed of sheet metal and the lower end portion of said section is inwardly tapered as at 27 and said tapered portion 27 snugly fits within the upper end portion of the lower section L and is secured thereto by the bolts 28, whereby a smoke-tight connection is obtained. Surrounding the upper end portion of the lower section L and resting upon the bolts 28 is a band 29, preferably nickel, and arcuate in cross section, and serves to deflect downwardly the heat radiating from the lower section L. Resting upon the upper section U is a top T provided at substantially the axial center of the section U with a flue 30 with which is adapted to be engaged a stove pipe.

Intersecting the flue 30 is a winding shaft 31 having an end portion extending exteriorly of said shaft and engaged with said extended portion of the shaft is a crank 32 for rotating the same. The extended portion of the shaft also has fixed thereto a ratchet wheel 33 with which coacts a gravity pawl 34 suitably supported by the flue 30 and which pawl coacts with the ratchet wheel to hold the winding shaft 31 against retrograde movement.

Secured to the shaft 31 at a point within the flue 30 is a flexible member 35 herein disclosed as a chain and which member extends downwardly within the upper section U and is secured to an upstanding yoke or bail 36 arranged at the axial center of a hollow drum D. The drum D in its normal or lowermost position is located adjacent the lower end of the upper section U.

The drum D is cylindrical in form and of a diameter slightly less than the interior diameter of the section U, and is substantially centrally spaced relative to said section U. To maintain the drum D in this position, the side wall thereof is provided with a plurality of equidistantly spaced and outwardly bowed spring members 37 contacting with the wall of the section U. These springs 37 serve as guides and are free from vibration, so that the drum D can be raised or lowered without noise.

The drum D is shallow and has its top wall at diametrically opposed points provided with the openings 38. Each of the openings 38 is defined by an upstanding flange or collar 39 preferably comprising a cast collar secured to the upper wall of the drum D. Engaged over each of the flanges or collars 39 and bolted or otherwise secured thereto is the lower end portion of a vertically disposed pipe or flue 40. The opposite end portion of the pipe or flue 40 is snugly directed through an opening 41 formed in the top T and which top is preferably substantially conical in form. The opening 41 is defined by an inwardly directed flange or collar 42 and which serves as a scraper, when the drum D is elevated, to clean from the pipe or flue any soot or the like which may have collected thereon. The upper end portion of the pipe or flue 40 is defined by an outstanding flange 43 which contacts with the upper face of the top T when the drum D is in its lowermost or normal position and which flange 43, in addition to limiting the downward movement of the drum D, also serves as a seal so that the passage of smoke or the like through the opening 41 is prevented.

The upper wall of the drum D has depending therefrom a radially disposed baffle 44 having its lower marginal portion spaced from the bottom wall of the drum and which assures a more equal distribution of air over the entire bottom of the drum as said air enters the drum through one of the pipes or flues 40 and discharges through the other.

The drum D serves as a heat conservator and as the air within the drum D begins to warm up, it rises and discharges through one of the pipes or flues 40 while the cold air passes downwardly through the second pipe or flue 40 and replaces the heated air discharged, and it will be obvious that the hotter the bottom of the drum D becomes, the faster the cold air enters within the drum and the hot air discharges therefrom.

When the drum D is in its normal or lowermost position, no fuel can be fed to the fire through the coal door 45 carried by the upper section U. When it is desired to feed the fuel, it is only necessary to rotate the shaft 31 sufficiently to elevate the drum D just above the door 45 where it is held by the coacting ratchet 33 and pawl 34. After the desired amount of fuel has been applied to the fire bed, the drum D is returned to its normal position.

The lower portion of the upper section U is provided therearound with an annular series of spaced openings 46 and which openings are positioned below but in close proximity to the drum D when in its lowermost or normal position. The openings 46 serve to admit air within the device so that the same may be readily mixed with the gases rising from the fire bed so that said gases are rendered combustible.

Surrounding the lower portion of the upper section U is a band 47 provided with a series of openings 48 adapted to register with the openings 46 when it is desired to admit air within the device. Upon slightly rotating the band 47, the openings 46 will be closed. It is particularly desired to have the openings 46 closed when starting a fire and when the chimney is cold and wind may be blowing down the flue and which might cause the smoke to emit through such openings 46.

49 denotes an annular band snugly fitting within the lower portion of the section U at a point below and in close proximity to the openings 46. This band 49 slopes downwardly in cross section and underlies the marginal portion of the drum D and serves to divert the heat produced in the lower section L from below up the side walls of the device and to deliver the air entering through the openings 46 below the drum D. The band 49 is also inwardly and downwardly inclined so that the fuel, when being placed in the device, will not lodge thereon and also to deflect the heat, gases and floating carbon toward the center of the drum D in order to effect the desired combustion.

My improved heating unit is particularly adapted for use in connection with soft coal and operates successfully to trap and hold the gases long enough for the same to be consumed and also prevents the escape of the major portion of the heat through the flue 30.

As the drum D is subjected to nearly all of the heat produced in the fire-pot F, said heat is held down in the lower section L and forced outwardly between the slats 17, so that a pronounced radiation of heat will occur through the wall of said lower section. As the hottest part of the fire is directly thereabove, consequently the bottom of the drum D is intensely heated, but is prevented from burning out by the cool air entering within the drum D through one of the pipes or flues 40. This air cools the bottom of the drum D no matter how fast the fire may be heating it and the hot air discharged through the second pipe or flue 40 effectively heats the room or the like in which the device is positioned, so that the heat which would otherwise pass out the flue 30 is utilized.

My improved device further operates to effect a pronounced saving of heat in connection with the openings 46. Most soft coal contains approximately 45 per cent. of its heat value in gas. This gas rapidly leaves the coal as the same gets hot and commences to burn and rise, but since it cannot escape except at the peripheral portion of the drum D, it follows with the smoke along the bottom of said drum, but the constant small streams of air entering through the openings 46 play along the bottom of the drum and resist the speed of the gas, resulting in an effective mixing of the oxygen with the gas, resulting in the burning of practically all of the gas, together with the carbon particles that may be carried with the escaping smoke. Therefore, the smoke which is discharged from the chimney is white and which clearly denotes that the carbon has been substantially entirely consumed.

My improved heating unit also serves effectually to radiate heat toward the floor due to the configuration of the lower section L and the band 29. This downward deflection of the heat is further facilitated by the band 50 similar to the band 29 and surrounding the upper portion of the section U and supported by the top T.

From the foregoing description, it is thought to be obvious that a heating unit constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, and means for elevating the drum.

2. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, and means for elevating the drum, said pipes being two in number and substantially diametrically opposed.

3. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, means for elevating the drum, and a baffle depending from the top wall of the drum and terminating above the lower wall.

4. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, and means for elevating the drum, said casing being provided in its side wall with a series of circumferentially spaced openings positioned below and in close proximity to the drum when the drum is in its lowermost position.

5. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, means for elevating the drum, and an inwardly directed continuous member positioned within the casing below the drum, said member being of a width to partially underlie the drum.

6. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, means for elevating the drum, and an inwardly directed continuous member positioned within the casing below the drum, said member being of a width to partially underlie the drum, said member being downwardly inclined in cross section.

7. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, means for elevating the drum, said casing being provided in its side wall with a series of circumferentially spaced openings positioned below and in close proximity to the drum when the drum is in its lowermost position, and an inwardly directed continuous member arranged within the casing below the openings and partially underlying the drum.

8. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, one of said pipes conveying cold air into the drum, and another pipe discharging hot air therefrom, and means for elevating the drum, the upper extremities of the pipes being provided with means for limiting the downward movement of the drum.

9. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, means for elevating the drum, and resilient guides carried by the peripheral portion of the drum for contact with the casing for maintaining the drum substantially central of the casing.

10. A device of the character described comprising a casing having a flue at its top and a fire-pot at the lower portion thereof, a hollow drum suspended within the casing above the fire-pot, a plurality of upstanding pipes carried by and in communication with the drum and loosely extending through the top, said pipes affording the only communication with the interior of the drum, one of said pipes conveying cold air into the drum, and another pipe discharging hot air from the drum, and means for elevating the drum, said drum being of a diameter slightly less than the diameter of the adjacent portion of the casing.

11. A device of the character described comprising a casing provided with openings in its top, said openings being defined by inwardly directed flanges, said top also having a flue in communication with the casing, a fire-pot positioned in the lower portion of the casing, a hollow drum suspended within the casing above the fire-pot, means for imparting vertical movement to the drum, and pipes carried by the drum and in communication therewith, said pipes extending through the openings in the top of the casing, one of said pipes conveying cold air into the drum and another pipe discharging hot air therefrom, the flanges defining the openings serving as scrapers for the pipes when the drum is vertically moved.

12. A device of the character described comprising a casing provided with openings in its top, said openings being defined by inwardly directed flanges, said top also having a flue in communication with the casing, a fire-pot positioned in the lower portion of the casing, a hollow drum suspended within the casing above the fire-pot, means for imparting vertical movement to the drum, and pipes carried by the drum and in communication therewith, said pipes extending through the openings in the top of the casing, the flanges defining the openings serving as scrapers for the pipes when the drum is vertically moved, the upper extremities of the pipes being provided with outstanding flanges contacting with the top of the casing to limit the downward movement of the drum, one of said pipes conveying cold air into the drum, and another pipe discharging hot air therefrom.

13. A device of the character described comprising a casing provided with openings in its top, said openings being defined by inwardly directed flanges, said top also having a flue in communication with the casing, a fire-pot positioned in the lower portion of the casing, a hollow drum suspended within the casing above the fire-pot, means for imparting vertical movement to the drum, and pipes carried by the drum and in communication therewith, said pipes extending through the openings in the top of the casing, the flanges defining the openings serving as scrapers for the pipes when the drum is vertically moved, the upper extremities of the pipes being provided with outstanding flanges contacting with the top of the casing to limit the downward movement of the drum and serving as sealing means, one of said pipes conveying cold air into the drum, and another pipe discharging hot air therefrom.

14. A device of the character described comprising a casing provided with openings in its top, a hollow drum suspended within the casing, means for imparting vertical movement to the drum and air circulating pipes carried by the drum and in communication therewith, said pipes extending through the openings in the top of the casing, one of said pipes conveying cold air into the drum and another pipe discharging hot air therefrom, the upper extremities of said pipes being provided with outstanding flanges contacting with the top of the casing to limit the downward movement of the drum.

In testimony whereof I hereunto affix my signature in the presence of two witnesses.

EVERETT W. RYER.

Witnesses:
BERTHA CARNAHAN,
C. R. FURROW.